(12) United States Patent
Kwak et al.

(10) Patent No.: US 7,630,725 B2
(45) Date of Patent: Dec. 8, 2009

(54) PAGING APPARATUS AND METHOD IN A MOBILE COMMUNICATION SYSTEM PROVIDING MULTIMEDIA BROADCAST MULTICAST SERVICE

(75) Inventors: Yong-Jun Kwak, Yongin-shi (KR); Hyeon-Woo Lee, Suwon-shi (KR); Myeong-Sook Seo, Suwon-shi (KR); Joon-Goo Park, Seoul (KR); Sung-Ho Choi, Songnam-shi (KR); Sung-Hoon Kim, Seoul (KR)

(73) Assignee: Samsung Electronics Co., Ltd (KR)

( * ) Notice: Subject to any disclaimer, the term of this patent is extended or adjusted under 35 U.S.C. 154(b) by 695 days.

(21) Appl. No.: 10/274,565

(22) Filed: Oct. 21, 2002

(65) Prior Publication Data

US 2003/0088695 A1    May 8, 2003

(30) Foreign Application Priority Data

Oct. 20, 2001    (KR)    ............... 10-2001-0064966

(51) Int. Cl.
    *H04W 68/00*    (2006.01)
(52) U.S. Cl. ............... 455/458; 455/426.1; 455/515; 455/17; 455/104; 455/403
(58) Field of Classification Search .............. 455/458, 455/515, 63.3, 422.1, 423, 424, 425, 426.1, 455/17, 104
    See application file for complete search history.

(56) References Cited

U.S. PATENT DOCUMENTS

| | | | | |
|---|---|---|---|---|
| 4,831,373 A * | 5/1989 | Hess | ............... | 370/341 |
| 5,684,859 A * | 11/1997 | Chanroo et al. | ............... | 455/433 |
| 5,757,782 A * | 5/1998 | Gaskill | ............... | 370/313 |
| RE36,056 E * | 1/1999 | Nonami | ............... | 455/321 |
| 5,870,426 A * | 2/1999 | Yokev et al. | ............... | 375/133 |
| 5,940,515 A * | 8/1999 | Kasavaraju | ............... | 380/270 |
| 6,069,871 A * | 5/2000 | Sharma et al. | ............... | 370/209 |
| 6,134,443 A * | 10/2000 | Spann et al. | ............... | 455/450 |
| 6,185,198 B1 * | 2/2001 | LaDue | ............... | 370/329 |
| 6,400,750 B1 * | 6/2002 | Lee et al. | ............... | 375/130 |
| 6,516,200 B1 | 2/2003 | Schmidt et al. | | |
| 6,526,027 B1 * | 2/2003 | Yeom | ............... | 370/312 |
| 6,724,779 B1 * | 4/2004 | Alleyne et al. | ............... | 370/517 |
| 6,745,056 B2 * | 6/2004 | Wang et al. | ............... | 455/574 |
| 6,826,408 B1 * | 11/2004 | Kim et al. | ............... | 455/466 |

(Continued)

*Primary Examiner*—Huy Q Phan
(74) *Attorney, Agent, or Firm*—The Farrell Law Firm, LLP

(57) ABSTRACT

A paging apparatus and method in a mobile communication system providing an MBMS (Multimedia Broadcast Multicast Service). In the mobile communication system, to page a UE for a first service through a primary carrier during a second service in progress through a secondary carrier, a PICH (Paging Indication Channel) transmitter in a Node B transmits paging indication information to the UE through the primary carrier by oscillating the primary carrier as a transmission frequency. A PCH (Paging Channel) transmitter transmits paging information to the UE through the primary carrier or the secondary carrier by oscillating the primary carrier or the secondary carrier as the transmission frequency under a predetermined control. A PBMSCH (Physical Broadcast Multicast Shared Channel) transmitter transmits data of the second service through the secondary carrier by oscillating the secondary carrier as the transmission frequency. A controller controls the primary carrier or the secondary carrier to be oscillated as the transmission frequency of the PCH transmitter if the paging indication information indicates paging.

17 Claims, 11 Drawing Sheets

U.S. PATENT DOCUMENTS 6,999,753 B2 2/2006 Beckmann et al.
2003/0114177 A1* 6/2003 Sinnarajah et al. .......... 455/515
2005/0147127 A1* 7/2005 Putcha et al. ............... 370/480

* cited by examiner

PAGING APPARATUS AND METHOD IN A MOBILE COMMUNICATION SYSTEM PROVIDING MULTIMEDIA BROADCAST MULTICAST SERVICE

PRIORITY

This application claims priority to an application entitled "Paging Apparatus and Method in a Mobile Communication System Providing Multimedia Broadcast Multicast Service" filed in the Korean Industrial Property Office on Oct. 20, 2001 and assigned Serial No. 2001-64966, the contents of which are hereby incorporated by reference.

BACKGROUND OF THE INVENTION

1. Field of the Invention

The present invention relates generally to a mobile communication system, and in particular, to a paging apparatus and method in a mobile communication system providing an MBMS (Multimedia Broadcast Multicast Service).

2. Description of the Related Art

CDMA (Code Division Multiple Access) generally uses a plurality of physical channels. The physical channels are common channels and dedicated channels. The common channels are shared among a plurality of UEs (User Equipments) within a cell area of a Node B, and the dedicated channels are assigned to particular UEs by the Node B. The common channels include a CPICH (Common Pilot Channel), a P-CCPCH (Primary Common Control Physical Channel), an S-CCPCH (Secondary Common Control Physical Channel), and a PICH (Paging Indicator Channel). The dedicated channels include a DPCH (Dedicated Physical channel).

In CDMA, broadcasting channels broadcast information to UEs. There are different broadcasting channels in a CDMA mobile communication system, for example, in a Release 99 mobile communication system. They are a BCH (Broadcasting Channel) and an FACH (Forward Access Channel). The BCH broadcasts SI (System Information) required for cell access to UEs, and the FACH sends control information about assignment of a dedicated channel and a broadcast message to a particular UE in addition to the function of the BCH. Since the main use of the broadcasting channels is to deliver common control information to UEs and control information to a particular UE, transmission of user data on the broadcasting channels is limited.

Recently, the development of communication technology has brought with it multicast multimedia communication that enables transmission of a large amount of data, such as packet data and circuit data, in addition to voice service in CDMA mobile communication systems. Thus many multicast multimedia applications have been proposed. Particularly, the MBMS has emerged as a future generation mobile communication service. The MBMS is a service that provides audio data and video data contemporaneously. Since the MBMS requires a large amount of transmission resources and is likely to cause concurrent provision of different services within a Node B on a large scale, it is provided on broadcasting channels. BMC (Broadcast Multicast Control), a single channel sharing technique, is free of constraints of temporal delay since it is applied to low rate transmission such as text broadcasting. As compared to the BMC, the MBMS is provided at a very high data rate and is sensitive to temporal delay. Therefore, the MBMS must be serviced in a different way from the BMC.

When transmitting a signal on a radio channel, the signal is modulated with a carrier having a higher frequency than the signal itself prior to transmission in order to improve transmission characteristics against external noise in a typical mobile communication system. Hence, the conventional CDMA mobile communication system sends physical channels available to a Node B with one carrier. In other words, both common channels and dedicated channels are transmitted with one carrier. However, resources are not sufficient to provide existing services in the conventional CDMA mobile communication system. Accordingly, it is obvious that the provision of the MBMS will lead to a further lack of resources.

In this context, studies have been conducted on a solution to the lack of resources to support the future generation mobile communication system requiring a large amount of resources.

SUMMARY OF THE INVENTION

It is, therefore, an object of the present invention to provide an apparatus and method for providing an MBMS through an additional carrier in a mobile communication system.

It is another object of the present invention to provide an apparatus and method for carrying out wireless communication through a plurality of carriers between a Node B and a UE in a mobile communication system.

It is a further object of the present invention to provide an apparatus and method for providing different services by switching carriers when the services are provided using a plurality of carriers.

It is still another object of the present invention to provide a paging apparatus and method in a mobile communication system providing different services through a plurality of carriers.

To achieve the above and other objects, a Node B provides a first service through a primary carrier to a first UE within its cell area and a second service to at least two UEs including the first UE through a secondary carrier having a different frequency from the primary carrier. To page the first UE during the second service in progress through the secondary carrier, a PICH (Paging Indicator Channel) transmitter transmits paging indication information to the first UE through the primary carrier by oscillating the primary carrier as a transmission frequency. A PCH (Paging Channel) transmitter transmits paging information to the first UE through the primary carrier or the secondary carrier by oscillating the primary carrier or the secondary carrier as the transmission frequency under a predetermined control. A PBMSCH (Physical Broadcast Multicast Shared Channel) transmitter transmits data of the second service through the secondary carrier by oscillating the secondary carrier as the transmission frequency. A controller controls the primary carrier or the secondary carrier to be oscillated as the transmission frequency of the PCH transmitter if the paging indication information indicates paging.

BRIEF DESCRIPTION OF THE DRAWINGS

The above and other objects, features, and advantages of the present invention will become more apparent from the following detailed description when taken in conjunction with the accompanying drawings in which.

DETAILED DESCRIPTION OF THE PREFERRED EMBODIMENTS

Preferred embodiments of the present invention will be described herein below with reference to the accompanying drawings. In the following description, well-known functions or constructions are not described in detail since they would obscure the invention in unnecessary detail.

It is to be noted that the present invention pertains to providing an MBMS in a CDMA mobile communication system. The MBMS provides a multimedia service to all UEs via one broadcasting channel in the CDMA mobile communication system, thus maximizing channel efficiency and increasing use efficiency of resources. As a result, a high quality service is available at a low cost.

The present invention is realized by transmitting a PBMSCH (Physical Broadcast Multicast Shared Channel) with an additional secondary carrier. Thus, a method of receiving a conventional CDMA service through a primary carrier and an MBMS through a secondary carrier in a UE is provided. The present invention also provides a method of paging through the secondary carrier to perform a conventional service when the paging is generated during the MBMS in progress through the secondary carrier.

Figure 1:
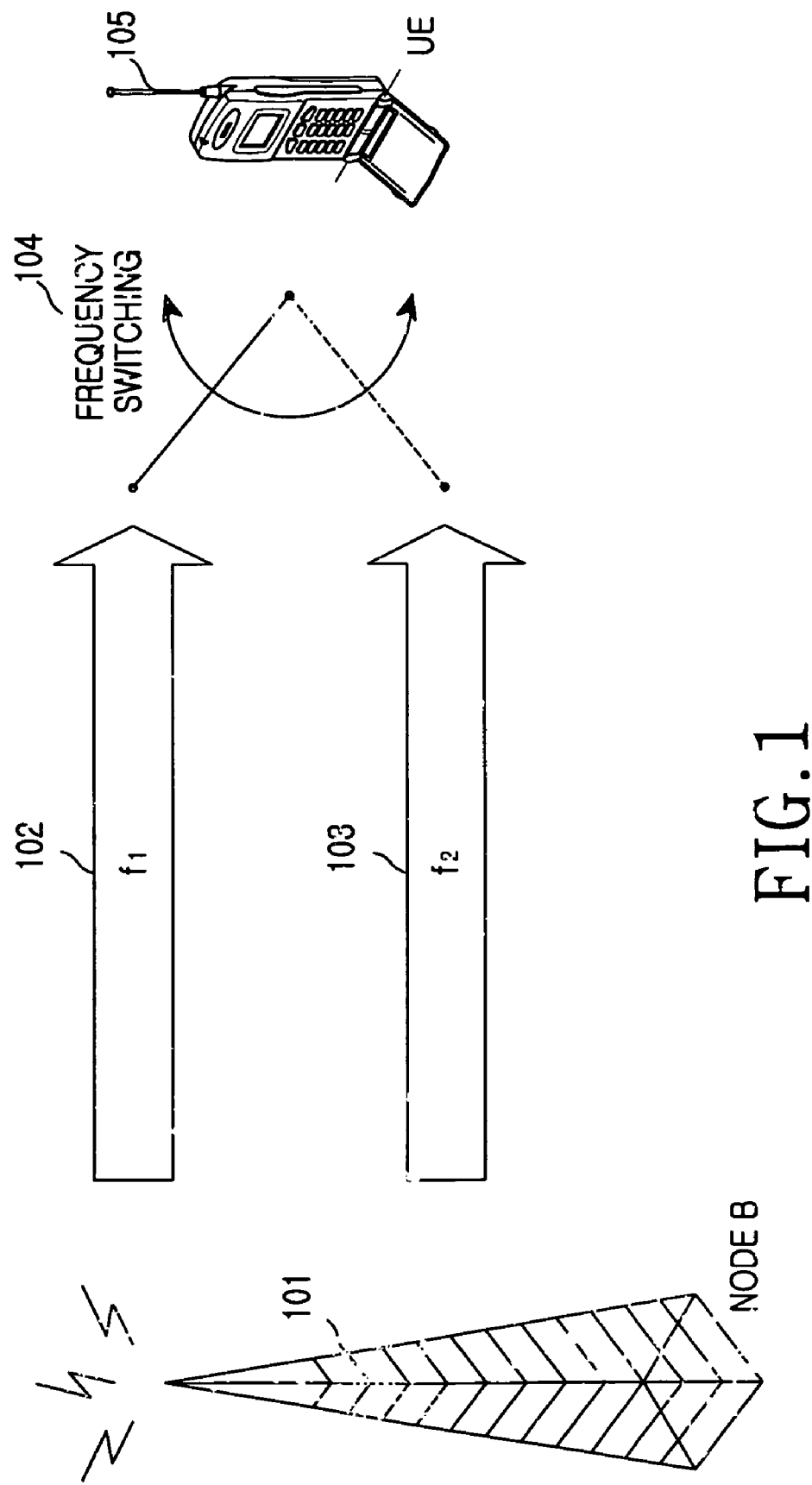
FIG. 1 schematically illustrates a system configuration for providing an MBMS through a plurality of carriers in a CDMA mobile communication system according to the present invention.

FIG. 1 schematically illustrates a system configuration for providing an MBMS through a plurality of carriers in a CDMA mobile communication system according to the present invention. Referring to FIG. 1, a Node B 101 sends a conventional common channel and a dedicated channel in combination through a primary carrier $f_1$ 102 and provides an MBMS through a secondary carrier $f_2$ 103. The common and dedicated channels include a CPICH, a P-CCPCH, an S-CCPCH, a PICH, and a DPCH. A PBMSCH and an S-CPICH (Secondary Common Pilot Channel) are transmitted through the secondary carrier $f_2$ 103. The PBMSCH is a physical channel for providing the MBMS. The S-CPICH is required for phase reference when a carrier is changed. A slot format for the PBMSCH will be described below with reference to FIG. 2.

Figure 2:
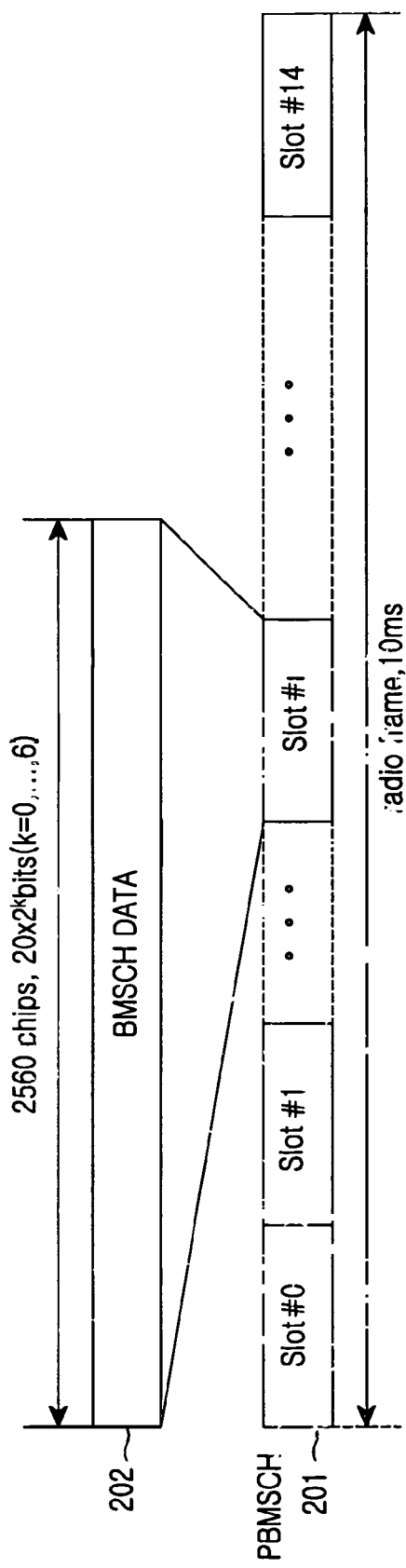
FIG. 2 illustrates a PBMSCH (Physical Broadcast Multicast Shared Channel) slot format according to the present invention.

FIG. 2 illustrates a format of a PBMSCH slot according to the present invention. Referring to FIG. 2, reference numeral 201 denotes a radio frame. One radio frame 201 includes 15 slots (slot #0-slot #14). The slots are same in structure. Slot #i 202 is taken as being representative of the slots. Slot #i 202 delivers only data, specifically multiplexed BMSCH (Broadcast Multicast Shared Channel) data. An SF (Spreading Factor) varies with the bit rates of services provided through BMSCHs and thus determines the number of bits per PBMSCH slot. The PBMSCH is a physical channel to which the BMSCHs, transport channels, are mapped.

A PBMSCH transmitting method for the MBMS disclosed in the present invention is compatible with services provided in the existing systems. As illustrated in FIG. 1, a UE 105 receives one carrier signal in a predetermined period. When channels for providing conventional services are transmitted through the primary carrier signal $f_1$ 102 and the PBMSCH is transmitted through the secondary carrier signal $f_2$ 103, frequency switching 104 occurs depending on which carrier the UE 105 receives. Therefore, the UE 105 must receive a new service, MBMS by frequency switching between the two carriers without adversely influencing the conventional services. In this context, the present invention proposes a frequency switching method providing a new service through a different carrier during an existing service in progress.

In the present invention, frequency switching occurs in two situations. In the first, the UE must receive a radio signal through the secondary carrier to receive the MBMS during receiving a radio signal through the primary carrier. In the other, the UE terminates the MBMS or must receive a radio signal through the primary carrier for a new voice call or a new service.

In the former situation, if the UE does not receive another service during receiving a radio signal through the primary carrier, it switches to the secondary carrier through an initial setup for the MBMS. In the latter situation, when the UE intentionally terminates the ongoing MBMS, it switches from the primary carrier to the secondary carrier. These operations are rather simple. However, when the UE receives a request for a service through the primary carrier, such as a voice call from a Node B during the MBMS in progress, it must be able to receive a paging signal from the Node B. The Node B must notify the UE that the UE is to receive the service through the primary carrier by sending a paging signal. In other words, the UE must receive paging information during the MBMS in progress through the secondary carrier.

Now, the paging will be described. When the UE uses only the primary carrier, it periodically monitors a PICH signal from the Node B and checks whether there is a PCH (Paging Channel) destined for the UE. Information about the PICH is contained in an SIB (System Information Block) #5 of a PCH. The UE acquires the PICH information and receives the PICH signal by checking the PCH.

Figure 3:
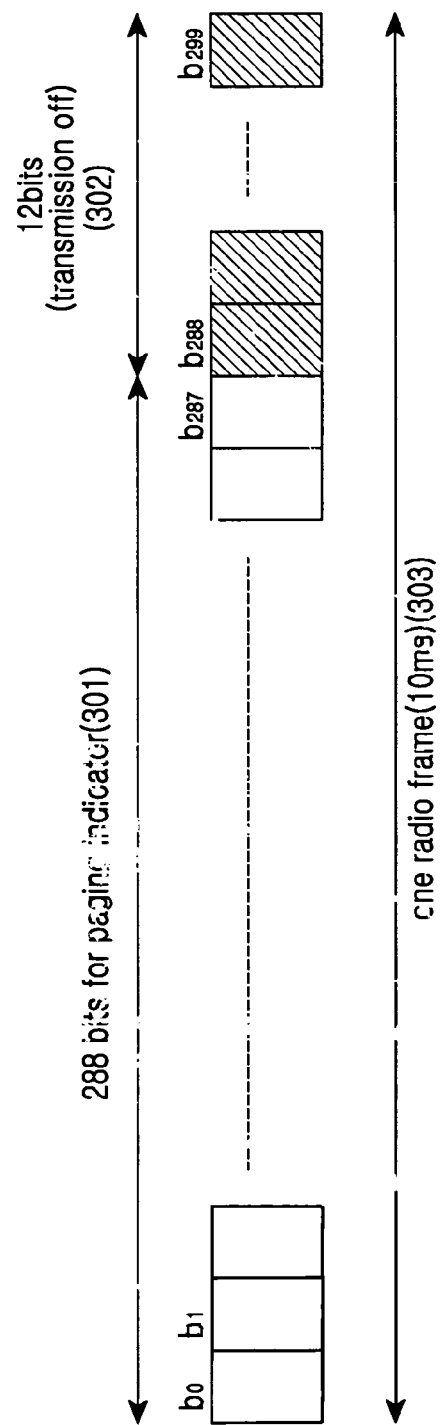
FIG. 3 schematically illustrates a typical PICH structure.

FIG. 3 illustrates a structure of the PICH. Referring to FIG. 3, one radio frame 303 is 10 ms in duration and has 300 bits ($b_0$ to $b_{299}$). 288 paging indicator bits are $b_0$ to $b_{287}$ in an area 301, and a 12-bit area 302 ($b_{288}$ to $b_{299}$) is reserved for future use.

Paging by the paging indicators in the area 301 of the radio frame 303 is expressed in Eq. (1) and Table 1.

$$q = \left(PI + \left\lfloor ((18 \times (SFN + \lfloor SFN/18 \rfloor + \lfloor SFN/64 \rfloor + \lfloor SFN/512 \rfloor)) \bmod 144) \times \frac{N_p}{144} \right\rfloor \right) \bmod N_p \quad (1)$$

where PI is a parameter from a higher layer, SFN (System Frame Number) is frame timing information counted by a Node B, and $N_p$ is the number of paging indicators per frame. q is determined from SFN, $N_p$, and PI, which are set for a UE at a given time. According to q, the positions of paging indicator bits assigned to the UE are determined. Table 1 illustrates mapping of a paging indicator Pq of a PICH, PICH $b_i$.

TABLE 1

| Number of paging indicators per frame ($N_p$) | $P_q = 1$ | $P_q = 0$ |
|---|---|---|
| $N_p = 18$ | $\{b_{16q}, \ldots, b_{16q+15}\} = \{-1, -1, \ldots, -1\}$ | $\{b_{16q}, \ldots, b_{16q+15}\} = \{+1, +1, \ldots, +1\}$ |
| $N_p = 36$ | $\{b_{8q}, \ldots, b_{8q+7}\} = \{-1, -1, \ldots, -1\}$ | $\{b_{8q}, \ldots, b_{8q+7}\} = \{+1, +1, \ldots, +1\}$ |
| $N_p = 72$ | $\{b_{4q}, \ldots, b_{4q+3}\} = \{-1, -1, \ldots, -1\}$ | $\{b_{4q}, \ldots, b_{4q+3}\} = \{+1, +1, \ldots, +1\}$ |
| $N_p = 144$ | $\{b_{2q}, \ldots, b_{2q+1}\} = \{-1, -1, \ldots, -1\}$ | $\{b_{2q}, \ldots, b_{2q+1}\} = \{+1, +1, \ldots, +1\}$ |

If the paging indicator bits are all −1s in Table 1, this implies that the UE must read a PCH. On the other hand, if they are all +1s, this implies that the UE does not need to read the PCH. The basic concept of paging is to read an S-CCPCH containing a PCH according to paging indicator bits determined according to the parameter q. The S-CCPCH is a physical channel to which a PCH being a transport channel is mapped.

Since it is determined whether the PCH is to be read or not by the above UE grouping, more than one UE may use the same paging indicator. In this case, despite receiving a paging indicator on a PICH, neither of the UEs may be wanted for paging on a PCH of the S-CCPCH.

The above paging occurs when all services are provided through a single carrier in the conventional technology. Meanwhile, the present invention pertains to paging when two carriers are used to provide two different services. That is, a UE receives a conventional service such as voice service through the primary carrier and an MBMS on a PBMSCH through the secondary carrier.

First Embodiment

In accordance with a first embodiment of the present invention, in order to enable paging during an MBMS in progress through the secondary carrier, a PICH and an S-CCPCH are used for paging through the secondary carrier. While the PICH and S-CCPCH are transmitted through the primary carrier, they are also assigned to the second carrier, so that a UE can monitor the PICH through the secondary carrier and check paging indication information during receiving a PBMSCH signal through the secondary carrier. If the paging indication information orders the UE to receive a PCH signal, the UE receives a PCH signal on the S-CCPCH through the secondary carrier and determines whether it is paged.

Transition to a primary-carrier service by receiving the PICH and the PCH during receiving a PBMSCH signal through the secondary carrier will be described with reference to FIG. 4.

Figure 4:
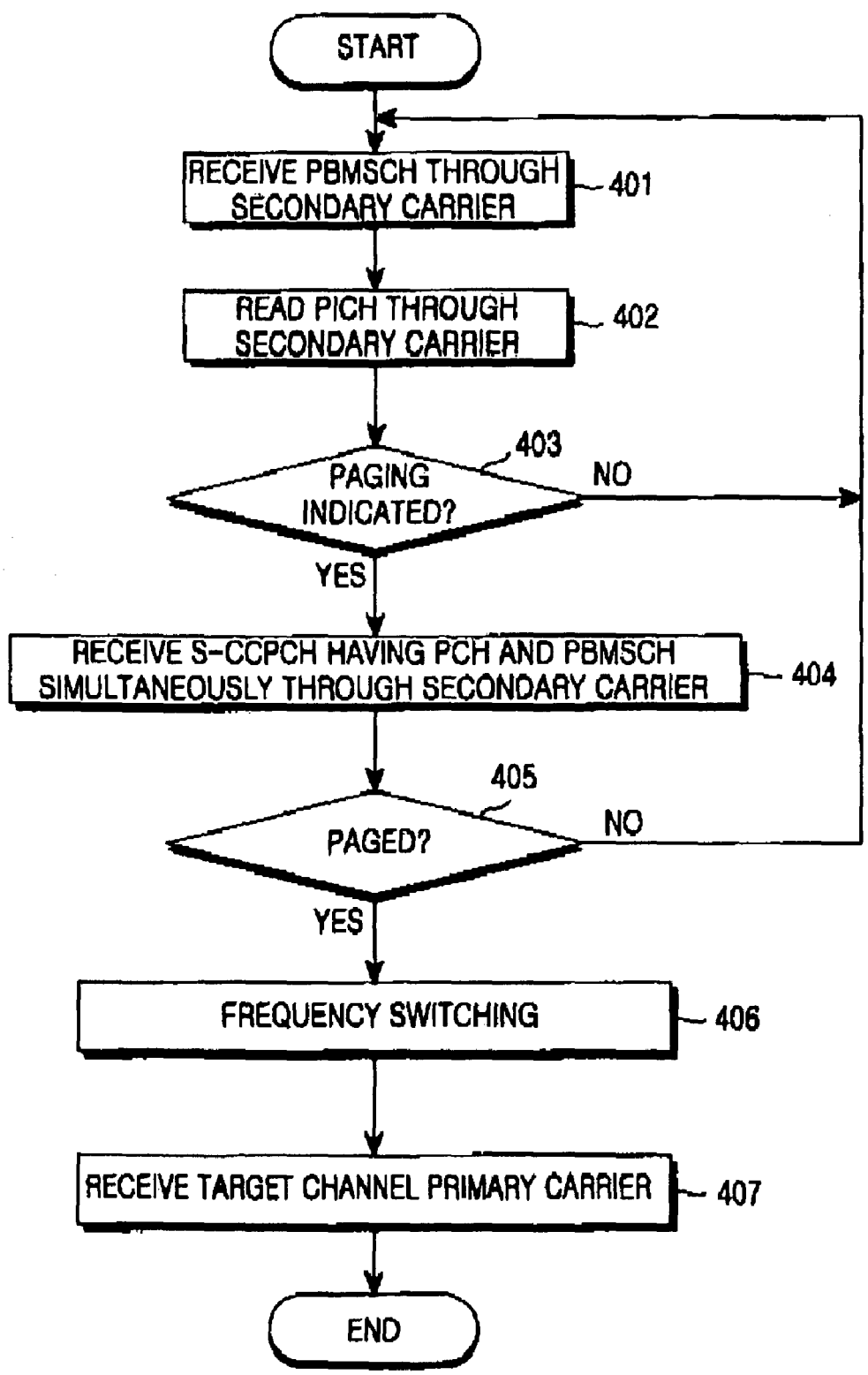
FIG. 4 is a flowchart illustrating a paging procedure during an MBMS in progress through a secondary carrier according to an embodiment of the present invention.

FIG. 4 is a flowchart illustrating a paging procedure during an MBMS in progress through a secondary carrier according to the first embodiment of the present invention. Referring to FIG. 4, a UE receives a PBMSCH signal from a Node B through a secondary carrier in step 401. In step 402, the UE periodically monitors a PICH through the secondary carrier during receiving a PBMSCH signal, analyzes the PICH signal, and reads a paging indicator from the PICH. The UE determines whether the paging indicator orders the UE to receive a PCH in step 403. If the paging indicator is −1, this implies that the UE is to receive a PCH signal and if the paging indicator is +1, the UE does not need to receive the PCH signal. In the latter case, the UE returns to step 401. In the former case, the UE receives an S-CCPCH signal as well as the PBMSCH signal through the secondary carrier and reads a PCH from the S-CCPCH in step 404. Then, the UE determines whether paging information set in the PCH is for it in step 405. If the paging information is not for the UE, the UE returns to step 401. On the contrary, if the paging information is destined for the UE, the UE establishes a path from which a radio channel signal can be received from the Node B through a primary carrier by frequency switching in step 406. The path establishment is carried out by switching the reception frequency of the UE from the secondary carrier to the primary carrier. In step 407, the UE receives a target channel signal among radio channel signals transmitted from the Node B through the primary carrier.

In accordance with the first embodiment of paging, the PICH and PCH are transmitted through the secondary carrier as well as through the primary carrier, so that the UE can receive paging information during receiving a PBMSCH signal through the secondary carrier. However, transmission of the same paging information through the two carriers decreases the efficiency of channel resources. To improve the channel resources efficiency, a second embodiment of paging is proposed.

Second Embodiment

In a second embodiment of the present invention, the PICH is additionally assigned to the secondary carrier for paging, which already includes the PBMSCH and the S-CPICH. While receiving a PBMSCH signal through the second carrier, a UE periodically monitors the PICH through the second carrier and reads paging indication information. If the paging indication information indicates paging, the UE temporarily discontinues reception of the PBMSCH signal, receives an S-CCPCH through the primary carrier by frequency switching, and reads a PCH from the S-CCPCH to determine whether it is paged.

Transition to a primary-carrier service by receiving the PICH while receiving the PBMSCH signal through the secondary carrier and then receiving the PCH through the primary carrier will be described with reference to FIG. 5.

Figure 5:
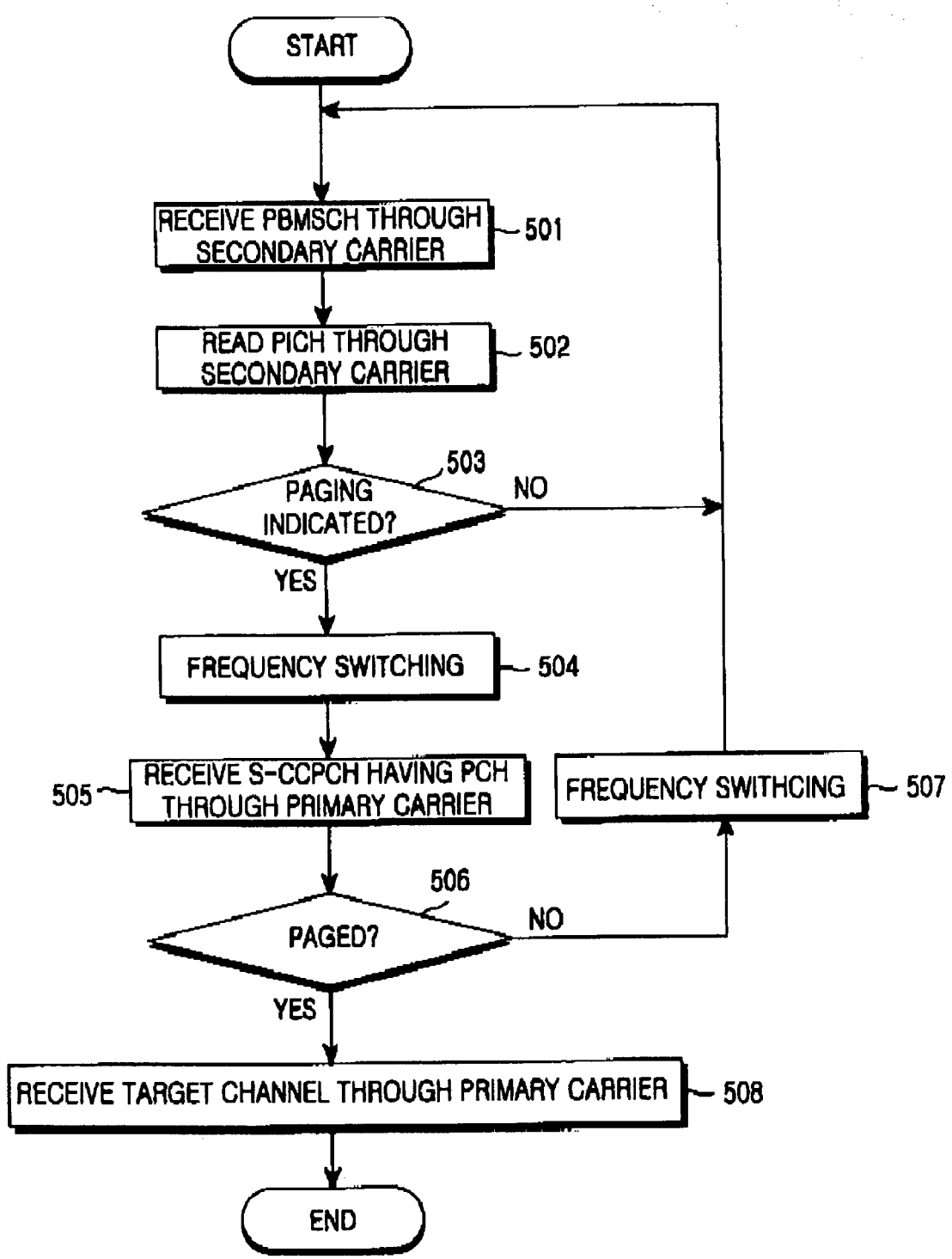
FIG. 5 is a flowchart illustrating a paging procedure during an MBMS in progress through a secondary carrier according to another embodiment of the present invention.

FIG. 5 is a flowchart illustrating a paging procedure during an MBMS in progress through the secondary carrier according to the second embodiment of the present invention. Referring to FIG. 5, a UE receives a PBMSCH signal from a Node B through a secondary carrier in step 501. In step 502, the UE periodically monitors a PICH through the secondary carrier while receiving the PBMSCH signal, analyzes the PICH, and reads a paging indicator from the PICH. The UE determines whether the paging indicator orders the UE to receive a PCH in step 503. If the paging indicator does not indicate paging, the UE returns to step 501. If the paging indicator indicates paging, the UE establishes a path from which radio channel signals can be received from the Node B through the primary carrier by frequency switching in step 504. The path establishment is carried out by switching the UE's reception frequency from the secondary carrier to the primary carrier. In step 505, the UE receives an S-CCPCH through the primary carrier and reads a PCH signal from the S-CCPCH.

In step 506, the UE determines the whether paging information set in the PCH is destined for it. If the paging information is not for the UE, the UE establishes a path by frequency switching, enabling the PBMSCH signal to be received through the secondary carrier in step 507 and returns to step 501. The path establishment is carried out by switching the reception frequency from the primary carrier to the secondary carrier. If the paging information is for the UE, the UE receives a target channel signal among radio channel signals transmitted from the Node B through the primary carrier in step 508.

In accordance with the second embodiment of paging, while the PICH signal is transmitted through the secondary carrier, the S-CCPCH including the PCH is transmitted through the primary carrier. Therefore, the problem of decreased channel resource efficiency as encountered in the first embodiment of paging is solved. Despite the advantage, however, mapping of paging indicators by grouping all UEs may lead to incorrect paging indication to some UEs. In this case, unnecessary frequency switching from the secondary carrier to the primary carrier and the opposite occurs twice to the UEs. During the frequency switching, reception of the PBMSCH signal is discontinued. As a result, MBMS efficiency is decreased. A third embodiment of paging according to the present invention is devised in order to overcome the limitations in terms of MBMS efficiency and channel resources efficiency.

Third Embodiment

As in the second embodiment of paging, the PICH as well as the PBMSCH and the S-CPICH are transmitted through the secondary carrier. While receiving the PBMSCH signal through the second carrier, a UE periodically monitors the PICH through the second carrier and reads paging indication information. If the paging indication information indicates paging, the UE temporarily discontinues reception of the PBMSCH signal, receives an S-CCPCH through the primary carrier by frequency switching, and reads a PCH signal from the S-CCPCH to determine whether it is paged. The third embodiment is different from the second embodiment in that the PICH signal is transmitted only to UEs that are receiving PBMSCH signals from a Node B. Paging indicator bits are mapped to the PICH by Eq. (1) or directly mapped to a physical channel without an information signal from a higher layer.

Transition to a primary-carrier service by receiving the PICH signal, which a Node B transmits only to UEs currently receiving an MBMS data, while receiving the PBMSCH signal through the secondary carrier and then receiving the PCH signal through the primary carrier will be described with reference to FIG. 6.

Figure 6:
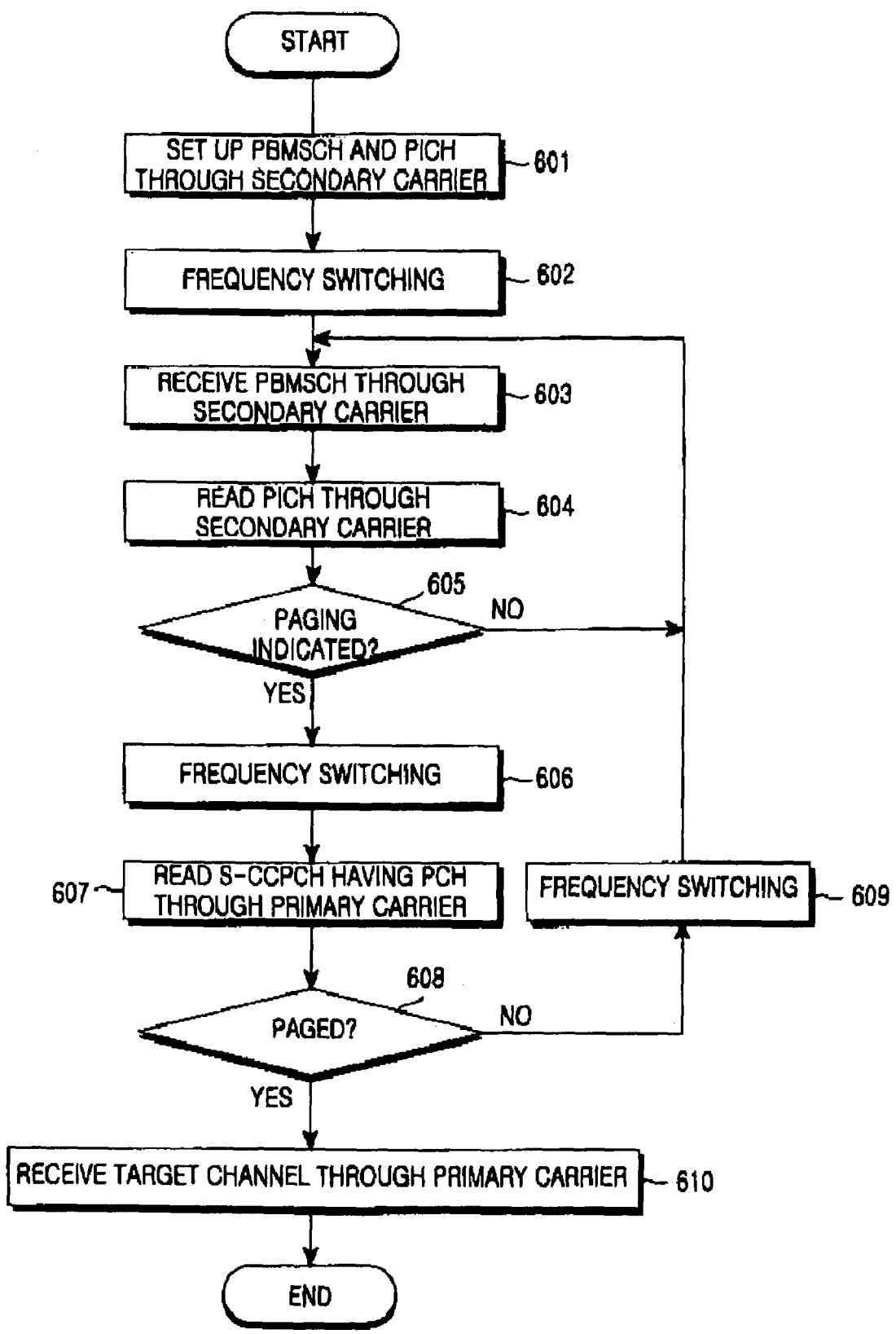
FIG. 6 is a flowchart illustrating a paging procedure during an MBMS in progress through a secondary carrier according to a third embodiment of the present invention.

FIG. 6 is a flowchart illustrating a paging procedure during an MBMS in progress through the secondary carrier according to the third embodiment of the present invention.

Referring to FIG. 6, when a UE is to receive MBMS data through the secondary carrier while receiving a target channel signal through the primary carrier, it initially sets up the PBMSCH and the PICH in step 601. In step 602, the UE establishes a path from which the PBMSCH signal can be received from the Node B through the secondary carrier by frequency switching. The path establishment is carried out by switching a UE's reception frequency from the primary carrier to the secondary carrier. The UE receives the PBMSCH signal from the Node B through the secondary carrier in step 603. The UE periodically monitors the PICH directed to particular UEs through the secondary carrier during receiving the PBMSCH signal, analyzes the PICH signal, and reads a paging indicator in step 604. The UE analyzes the paging indicator and determines whether the paging indicator orders the UE to receive a PCH according to the value of the paging indicator in step 605. If the paging indicator does not indicate paging, the UE returns to step 603. If the paging indicator indicates paging, the UE establishes a path by frequency switching, enabling radio channel signals to be received from the Node B through the primary carrier in step 606. The path establishment is carried out by switching the reception frequency from the secondary carrier to the primary carrier. Then, the UE receives an S-CCPCH signal through the primary carrier and reads a PCH signal from the S-CPCCH in step 607. In step 608, the UE determines whether paging information in the PCH signal is destined for it. If the paging information is not for the UE, the UE establishes the path for receiving the PBMSCH signal through the secondary carrier by frequency switching in step 609 and returns to step 603. The path establishment is carried out by switching the reception frequency from the primary carrier to the secondary carrier. If the paging information is for the UE, the UE receives a target channel signal among radio channel signals transmitted from the Node B through the primary carrier in step 610.

In accordance with the third embodiment of paging, paging indicators are mapped on the PICH only for particular UEs using the secondary carrier. The maximum number of UEs that can receive an MBMS data through the secondary carrier is equal to or less than that of paging indicators that can be mapped on the PICH. Therefore, the Node B assigns one available paging indicator bits to a UE that initiates an MBMS. The number of UEs that can receive the MBMS can be increased by using more PICHs.

The problem of decreased channel resource efficiency as encountered in the first embodiment of paging is solved by checking paging information on the PCH through the primary carrier, and the problem of unnecessary frequency switching and the resulting decreased service efficiency as encountered in the second embodiment of paging is solved by limiting transmission of the PICH only to UEs that are currently receiving the MBMS.

A description will be made below of a transmitter and a receiver for implementing the above-described paging in the CDMA mobile communication system according to the embodiments of the present invention.

Figure 7:
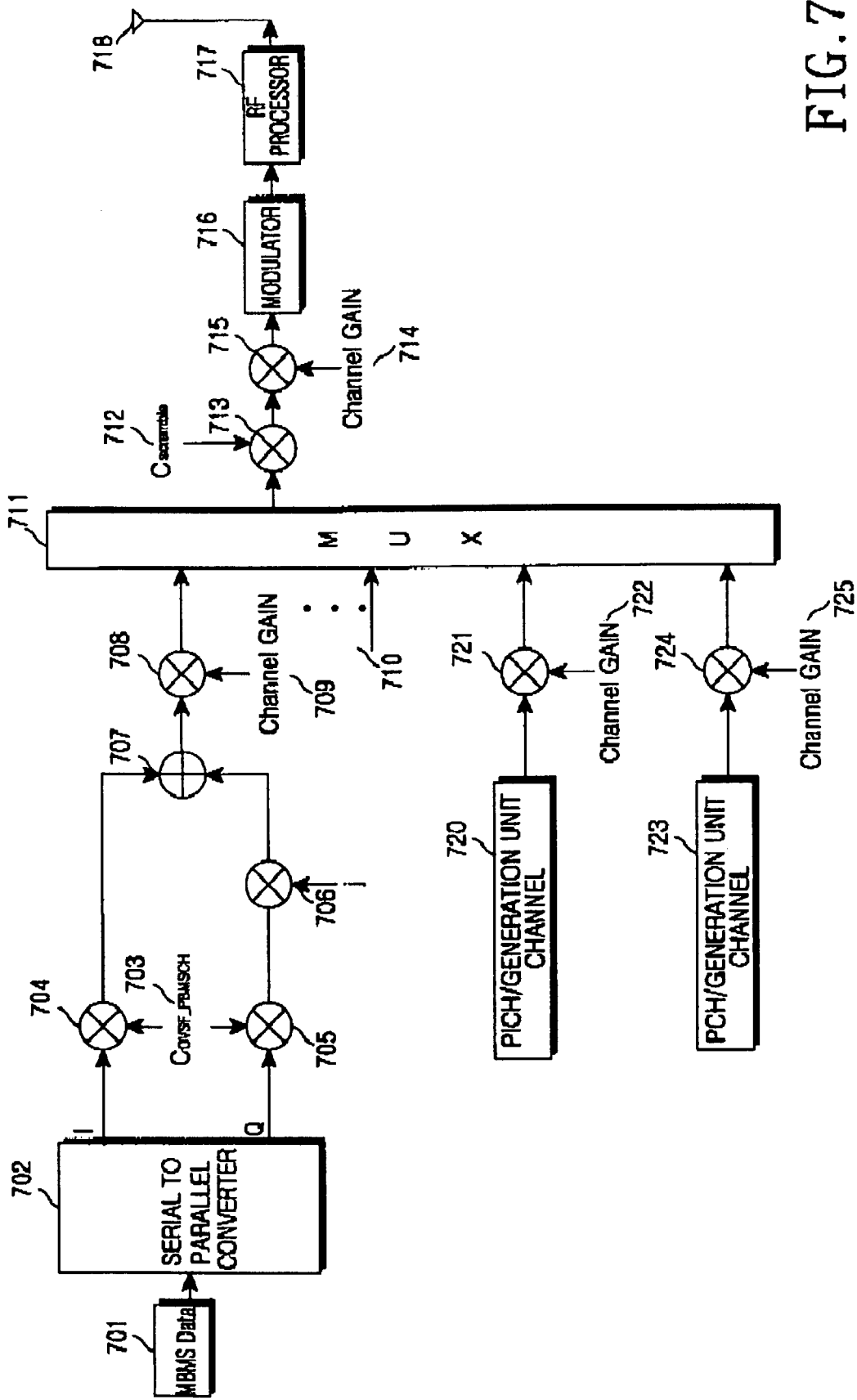
FIG. 7 is a block diagram of a transmitter for transmitting secondary-carrier signals to implement paging according to the embodiments of the present invention.

FIG. 7 is a block diagram of a transmitter for transmitting second-carrier signals to implement paging according to the embodiments of the present invention. Referring to FIG. 7, a serial to parallel converter (SPC) 702 converts MBMS data 701 to parallel I and Q channel signals for QPSK (Quadrature Phase Shift Keying) modulation and feeds the I and Q channel signals to multipliers 704 and 705, respectively. The multipliers 704 and 705 multiply the I and Q channel signals by a channelzation code $C_{OVSF\_PBMSCH}$ 703 assigned to a PBMSCH, respectively. A multiplier 706 multiplies the Q channel signal received from the multiplier 705 by a signal j, for a 90° phase shift. An adder 707 adds the outputs of the multipliers 704 and 706. A multiplier 708 multiplies a signal received from the adder 707 by a predetermined channel gain 709 and feeds the product to a multiplexer (MUX) 711. When there are a plurality of PBMSCHs, as many sets of the devices 701 to 708 and the channel gain 709 as the number of the PBM-SCHs are required. The resulting PBMSCH signals are fed to the MUX 711.

A PICH generation unit 720 generates a PICH signal containing paging indicator bits for UEs within a Node B. A multiplier 721 multiplies the PICH signal by a predetermined channel gain $g_{PICH}$ 722, for channel compensation. A PCH generation unit 723 generates a PCH signal containing paging information for each UE within the Node B. A multiplier 724 multiplies the PCH signal by a predetermined channel gain $g_{PCH}$ 725, for channel compensation.

The MUX 711 multiplexes the PBMSCH signal, the PICH signal, and the PCH signal. A multiplier 713 multiplies the output of the MUX 711 by a predetermined scrambling code $C_{SCRAMBLE}$ 712. Thus the multiplier 713 acts as a scrambler. A multiplier 715 multiplies the scrambled signal by a predetermined channel gain 714. A modulator 716 modulates the output of the multiplier 715 with the secondary carrier. An RF (Radio frequency) processor 717 converts the modulation signal to an RF signal transmittable in the air. The RF signal is transmitted in the air via an antenna 718.

While the transmitter transmits the PBMSCH signal, PICH signal, and PCH signal (i.e., S-CCPCH) through the secondary carrier according to the first embodiment of the present invention, transmitters for transmitting the PBMSCH and the PICH through the secondary carrier according to the second and third embodiments of the present invention can be realized by omitting the PCH generation unit 723 and the multiplier 724.

Alternatively, transmitters for performing the paging procedures according to the first, second, and third embodiments of the present invention can be implemented by appropriate control of the MUX 711. For paging according to the first embodiment, the MUX 711 multiplexes all input signals. For paging according to the second and third embodiments, the MUX 711 multiplexes only the PBMSCH and the PICH signals.

Figure 8:
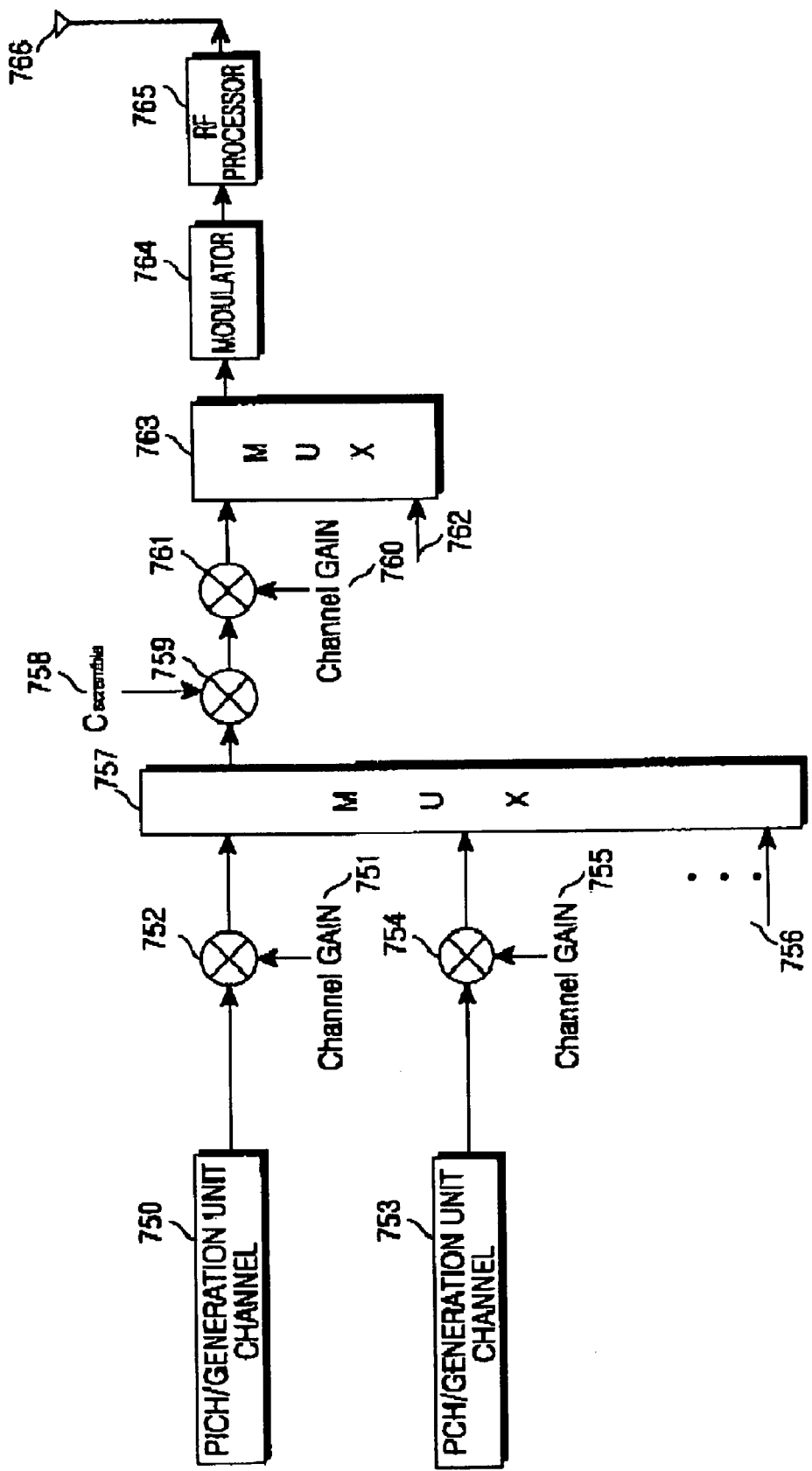
FIG. 8 is a block diagram of a transmitter for transmitting primary-carrier signals to implement paging according to the embodiments of the present invention.

FIG. 8 is a block diagram of a transmitter for transmitting primary-carrier signals to implement the paging according to the embodiments of the present invention. Referring to FIG. 8, a PICH generation unit 750 generates a PICH signal containing paging indicator bits for UEs within the Node B. A multiplier 752 multiplies the PICH signal by a predetermined channel gain $g_{PICH}$ 751, for channel compensation. A PCH generation unit 753 generates a PCH signal containing paging information for each UE within the Node B. A multiplier 754 multiplies the PCH signal by a predetermined channel gain $g_{PCH}$ 755, for channel compensation.

A MUX 757 multiplexes the outputs of the multipliers 752 and 754. A multiplier 759 multiplies the output of the MUX 757 by a predetermined scrambling code $C_{SCRAMBLE}$ 758. Thus the multiplier 759 acts as a scrambler. A multiplier 761 multiplies the scrambled signal by a predetermined channel gain 760. A MUX 763 multiplexes the output of the multiplier 761 and other input signals 762 scrambled with different scrambling codes. A modulator 764 modulates the output of the MUX 763 with the primary carrier. An RF processor 765 converts the modulation signal to an RF signal transmittable in the air. The RF signal is transmitted in the air via an antenna 766.

While pairs of the PICH generation units 720 and 750, the PCH generators 723 and 753, and the antennas 718 and 766 each are separately illustrated in FIGS. 7 and 8, each pair can be integrated into one single device.

Figure 9:
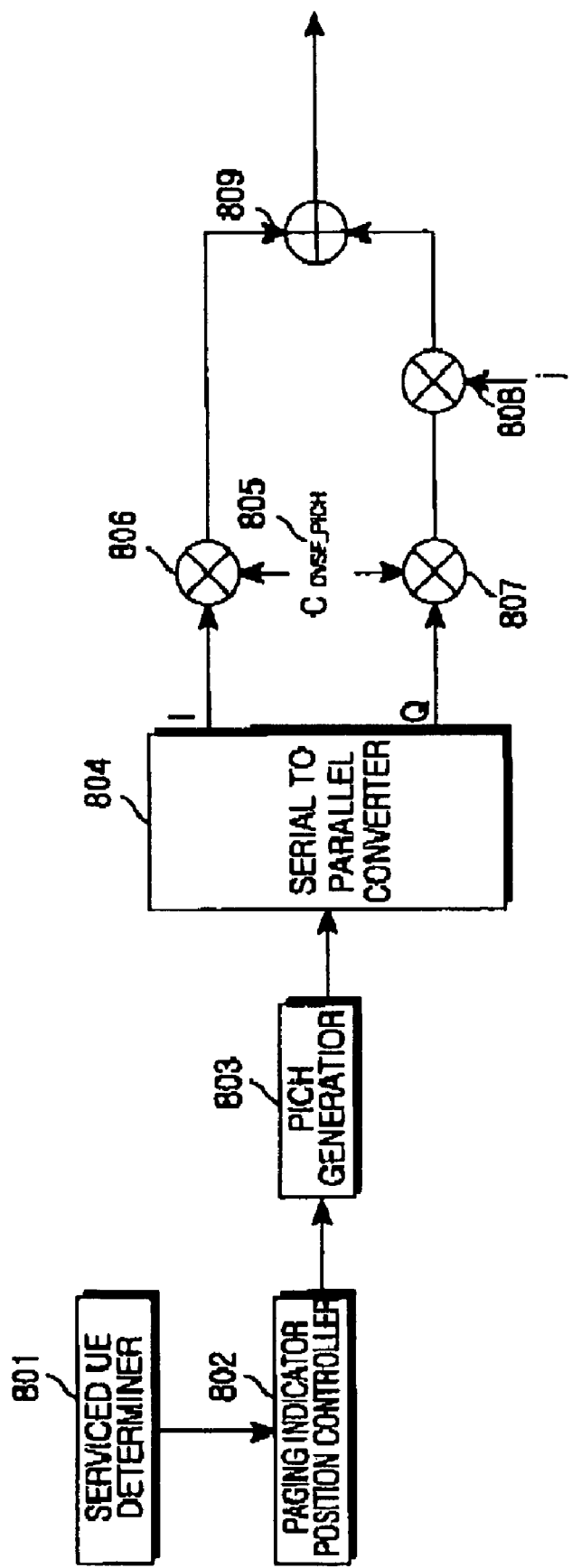
FIG. 9 is a block diagram of PICH generation units illustrated in FIGS. 7 and 8.

FIG. 9 is a block diagram of the PICH generation units illustrated in FIGS. 7 and 8. Referring to FIG. 9, a serviced UE determiner 801 feeds control information from a higher layer, including information about UEs that are currently being serviced, to a controller 802. A paging indicator position controller 802 controls the position of a paging indicator for each UE according to the control information. A PICH generator 803 generates a PICH signal according to information received from the paging indicator position controller 802. An SPC 804 converts the PICH signal to parallel I and Q channel signals. A multiplier 806 multiplies the I channel signal by a PICH channelization code $_{COVSF\_PICH}$ 805. A multiplier 807 multiplies the Q channel signal by the PICH channelization code $_{COVSF\_PICH}$ 805. A multiplier 808 multiplies the output of the multiplier 807 by a signal j to shift the phase of the Q channel signal by 90°. An adder 809 adds the outputs of the multipliers 806 and 808, thereby combining the I and Q channel signals. The combined signal is fed to the multiplier 721 illustrated in FIG. 7 and the multiplier 752 illustrated in FIG. 8.

Meanwhile, the serviced UE determiner 801 is not required in the first and, second embodiments but is needed in the third embodiment because PICH grouping varies according to the carriers. The same paging indicator position controller 802 can be applied to the PICH generation units 720 and 750 illustrated in FIGS. 7 and 8 since a paging indicator position control is performed in the same manner in the first and second embodiments. However, different paging indicator position controls are carried out according to carriers in the PICH generation units 720 and 750 in the third embodiment of the present invention.

Figure 10:
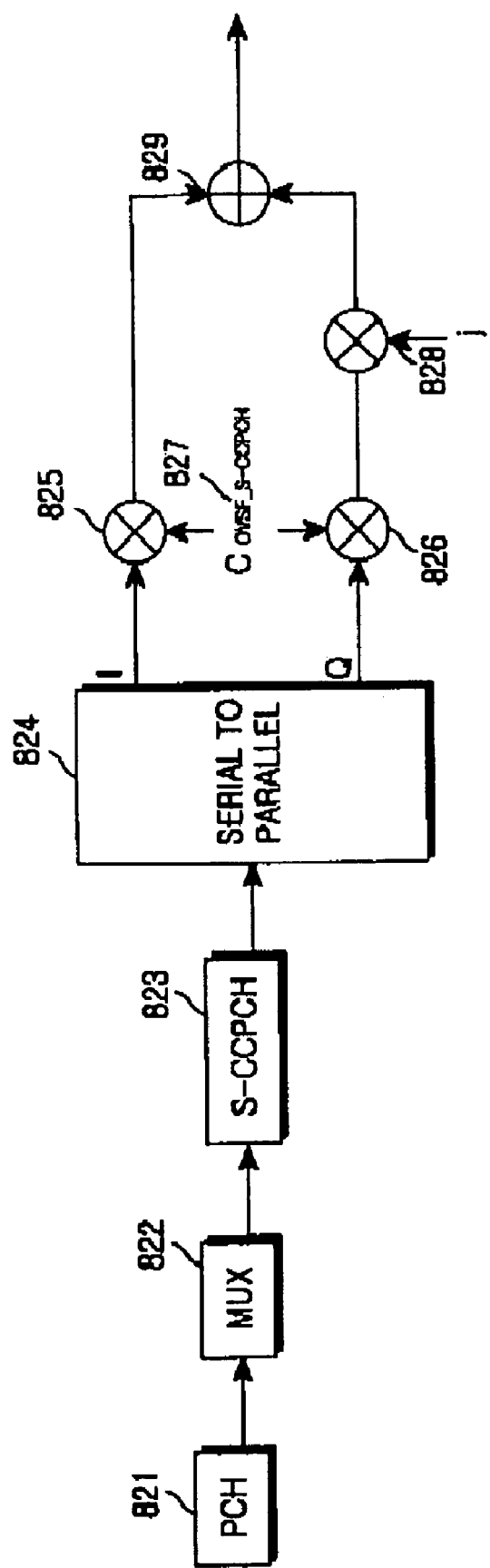
FIG. 10 is a block diagram of PCH generation units illustrated in FIGS. 7 and 8.

FIG. 10 is a block diagram of the PCH generators 723 and 753 illustrated in FIGS. 7 and 8. Referring to FIG. 10, a PCH generator 821 generates a PCH signal and a MUX 822 multiplexes the PCH signal. An S-CCPCH generator 823 maps the PCH signal to an S-CCPCH signal. An SPC 824 separates the S-CCPCH signal to I and Q channels signals, for QPSK modulation. A multiplier 825 multiplies the I channel signal by a predetermined PCH channelization code $C_{OVSFS\_S-CCPCH}$ and a multiplier 826 multiplies the Q channel signal by the PCH channelization code $C_{COVSF\_S-CCPCH}$. A multiplier 828 multiplies the output of the multiplier 826 by a signal j to shift the phase of the Q channel signal by 90°. An adder 829 adds the outputs of the multipliers 826 and 828, thereby combining the I and Q channel signals. The combined signal is fed to the multiplier 724 illustrated in FIG. 7 and the multiplier 754 illustrated in FIG. 8.

Figure 11:
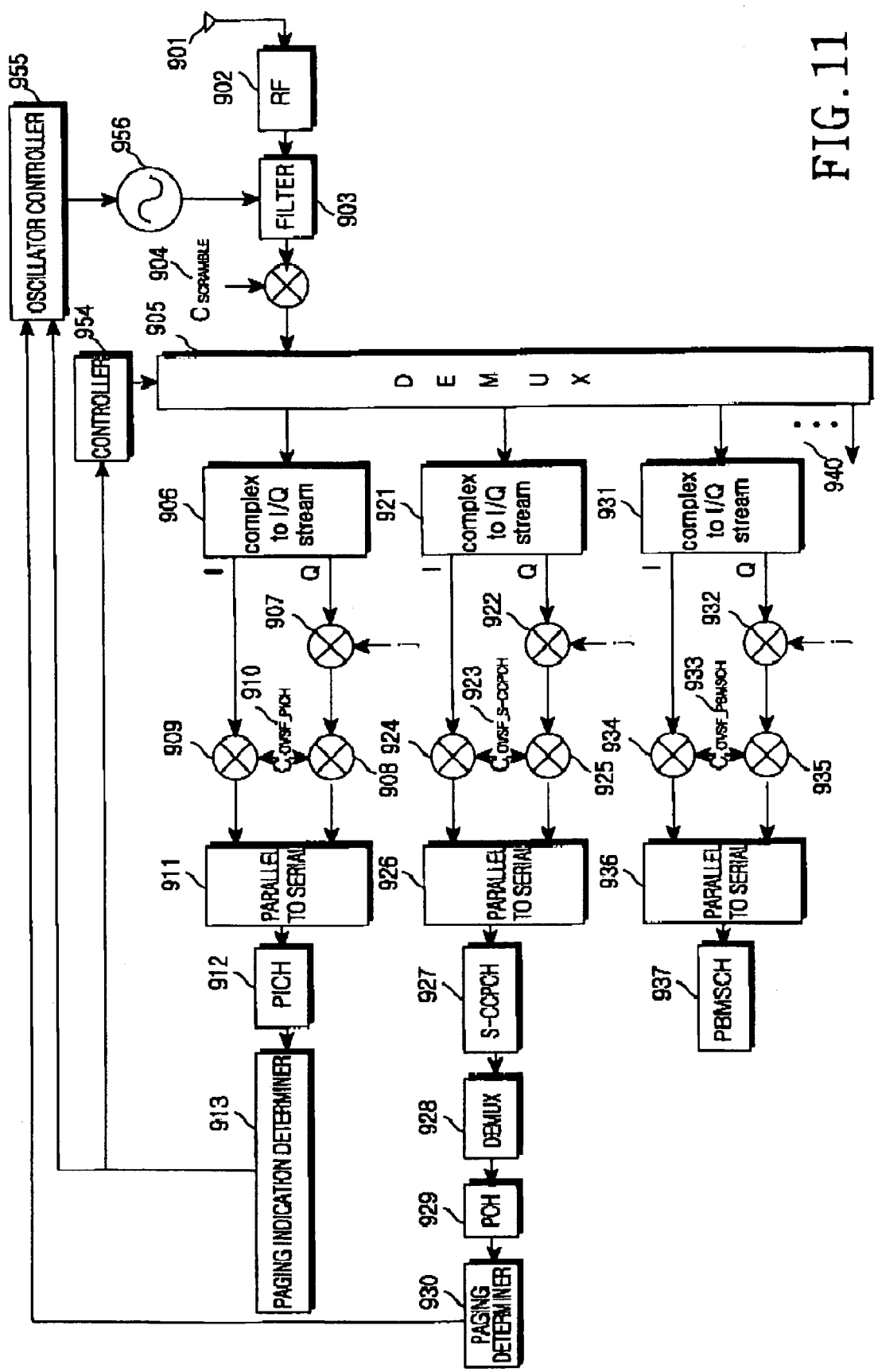
FIG. 11 is a block diagram of a receiver to implement paging according to the embodiments of the present invention.

FIG. 11 is a block diagram of a receiver according to the present invention. Referring to FIG. 11, an RF processor 902 converts an RF signal received through an antenna 901 to a baseband signal. A filter 903, which is connected to an oscillator 956, filters the baseband signal using a frequency generated in the oscillator 956. The oscillation frequency generated from the oscillator 956 is controlled by an oscillator controller 955. A multiplier 904 descrambles the output of the filter 903 by multiplying it by the same scrambling code as used in the transmitter. Thus the multiplier 904 acts as a descrambler. A DEMUX (demultiplexer) 905 demultiplexes the descrambled signal into a PICH signal, a PCH signal, a PBMSCH signal, and other signals under the control of a controller 954.

A complex to I/Q stream block 906 separates the PICH signal into I and Q channel signals. A multiplier 907 multiplies the Q channel signal received from the complex to I/Q stream block 906 by a signal j, thereby converting the Q channel signal to a real number signal. A multiplier 908 multiplies the Q channel signal received from the multiplier 907 by a PICH channelization code $C_{OVSF\_PICH}$ as used for the PICH in the transmitter, and a multiplier 909 multiplies the I channel signal received from the complex to I/Q stream block 906 by the PICH channelization code $C_{OVSF\_PICH}$. A parallel-to-serial converter (PSC) 911 converts the outputs of the multipliers 908 and 909 to a serial signal. A PICH generator 912 generates a PICH signal from the output of the PSC 911. A paging indication determiner 913 determines whether the PICH signal indicates paging.

A complex to I/Q stream block 921 separates the PCH signal into I and Q channel signals. A multiplier 922 multiplies the Q channel signal received from the complex to I/Q stream block 921 by the signal j, thereby converting the Q channel signal to a real number signal. Multipliers 924 and 925 respectively multiply the I channel signal received from the complex to I/Q stream block 921 and the Q channel signal received from the multiplier 922 by an S-CCPCH channelization code $C_{OVSF\_S\text{-}CCPCH}$ as used for the S-CCPCH in the transmitter. A PSC 926 converts the outputs of the multipliers 924 and 925 to a serial signal. An S-CCPCH generator 927 generates an S-CCPCH signal from the output of the PSC 926. A DEMUX 928 demultiplexes the S-CCPCH signal. A PCH generator 929 generates a PCH signal from the output of the DEMUX 928. A paging determiner 930 checks paging information from the PCH signal.

A complex to I/Q stream block 931 separates the PBMSCH signal into I and Q channel signals. A multiplier 932 multiplies the Q channel signal received from the complex to I/Q stream block 931 by a signal j, thereby converting the Q channel signal to a real number signal. A multiplier 934 multiplies the I channel signal received from received from the complex to I/Q stream block by a PBMSCH channelization code $C_{OVSF\_PBMSCH}$ as used for the PBMSCH in the transmitter, and a multiplier 935 multiplies the Q channel signal received from the multiplier 932 by the PBMSCH channelization code $C_{OVSF\_PBMSCH}$. A PSC 936 converts the outputs of the multipliers 934 and 935 to a serial signal. A PBMSCH generator 937 generates a PBMSCH signal from the output of the PSC 936. Thus, the receiver receives an MBMS.

In the first embodiment of paging, when the paging indication determiner 913 determines that there is a paging indication, the controller 954 controls the DEMUX 905 to output the S-CCPCH signal, specifically the PICH signal. When the PCH signal is acquired, the paging determiner 930 then determines whether the UE is paged. If it is paged, the paging determiner 930 drives the oscillator controller 955, notifying the paging. The oscillator controller 955 controls the oscillator 956 to generate the primary or secondary carrier selectively. Under the control of the oscillator controller 955, frequency switching is carried out between the primary carrier and the secondary carrier using the oscillator 956.

In the second embodiment of paging, when the paging indication determiner 913 determines that there is a paging indication, it notifies the oscillator controller 955 of the paging indication. The oscillator controller 955 then controls the oscillator 956 to perform frequency switching between the primary carrier and the secondary carrier.

In the third embodiment of paging, signal processing is performed in the same manner as in the second embodiment except that the paging indication determiner 913 determines whether there is a paging indication in a different manner depending on the primary carrier or the secondary carrier.

The operations of a Node B and a UE in relation to an MBMS through the secondary carrier will be described referring to FIG. 12.

Figure 12:
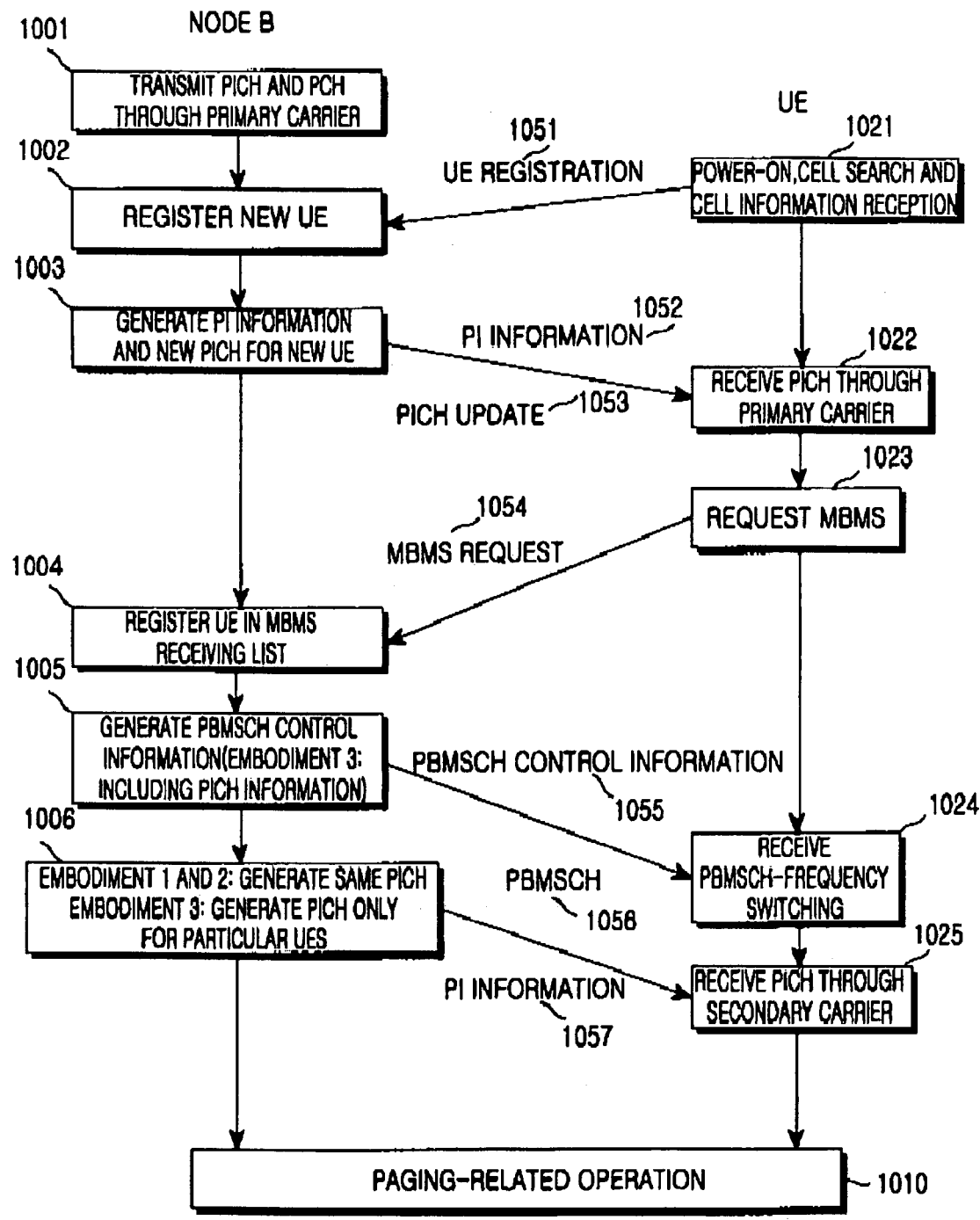
FIG. 12 is a diagram illustrating a signal flow for paging between a Node B and a UE receiving the MBMS through a secondary carrier.

FIG. 12 is a diagram illustrating a signal flow for providing an MBMS from a Node B to a UE through the secondary carrier according to the present invention. Referring to FIG. 12, the Node B transmits PICH and PCH signals through the primary carrier in step 1001. Meanwhile, the UE receives cell information from a cell that it belongs to as it is searched for by a cell search when power is on in step 1021 and transmits a UE registration request to the Node B in step 1051. Upon receipt of the UE registration request during transmission the PICH and PCH signals, the Node B registers the new UE in step 1002. In step 1003, the Node B generates PI information for paging the UE and transmits the PICH signal to the UE in correspondence to the PI information. Contemporaneously, the Node B transmits the new PI information to the UE in step 1052 and transmits the resulting PICH update signal through the primary carrier in step 1053. The UE monitors the PICH periodically and obtains paging information. Meanwhile, upon request for an MBMS from a user in step 1023, the UE transmits the MBMS request to the Node B and the Node B registers the requesting UE in an MBMS receiving UE list in step 1004. The Node B generates PBMSCH control information to the UE in step 1005 and the UE receives the control information and thus a PBMSCH signal in step 1024. While an RNC (Radio Network Controller) actually controls registration for the MBMS and transmission of the PBMSCH control information, a description of an MBMS-related operation between the Node B and the RNC will not be provided here for convenience. The PBMSCH control information may contain information about the frequency and physical channel code of the PBMSCH.

Since the Node B transmits the PBMSCH signal through the secondary carrier in step 1055, the PICH and PCH signals need to be transmitted through the secondary carrier simultaneously. In the first and second embodiments of paging, the PICH update transmitted in step 1053 is also transmitted through the secondary carrier. Therefore, the Node B adopts the same PI, SFN, $N_p$ parameters. On the other hand, in the third embodiment of paging, since the PICH is confined to UEs that are receiving secondary-carrier signals, the Node B updates the PICH according to paging indicator positions for the UEs registered for the MBMS in step 1006. The paging indicator position information is also transmitted to the UE in step 1057. Then the UE can receive the PICH signal through the secondary carrier. Consequently, the UE can be paged during the MBMS in progress through the secondary carrier in order to receive a channel signal through the primary carrier.

In accordance with the present invention, it is possible to page a UE while an MBMS is in progress through a secondary carrier in order to provide an existing service through a primary carrier in a mobile communication system supporting the MBMS. Such paging maximizes the efficiency of radio transmission resources and removes errors involved with paging by UE grouping.

While the invention has been shown and described with reference to certain preferred embodiments thereof, it will be understood by those skilled in the art that various changes in form and details may be made therein without departing from the spirit and scope of the invention as defined by the appended claims.

What is claimed is:

1. An apparatus for paging a UE (User Equipment) for a first service while a second service, different from the first service, is in progress at a Node B in a mobile communication system including the Node B and a plurality of UEs within a cell area of the Node B, the Node B providing the first service through a primary carrier and providing the second service through a secondary carrier having a different frequency from the primary carrier, the apparatus comprising:

a first PICH (Paging Indication Channel) transmitter for transmitting paging indication information to the UE through the primary carrier by oscillating the primary carrier as a transmission frequency;

a PCH (Paging Channel) transmitter for transmitting paging information to the UE through the primary carrier by oscillating the primary carrier as the transmission frequency;

a second PICH transmitter for transmitting paging indication information to the UE through the secondary carrier by oscillating the secondary carrier as a transmission frequency; and a PBMSCH (Physical Broadcast Multicast Shared Channel) transmitter for transmitting data of the second service through the secondary carrier by oscillating the secondary carrier as the transmission frequency.

2. The apparatus of claim 1, wherein the PICH transmitter transmits the paging indication information only to UEs receiving the second service.

3. An apparatus for receiving paging for a first service from a Node B while a second service, different from the first service, is in progress at a UE (User Equipment) in a mobile communication system including the Node B and a plurality of UEs within a cell area of the Node B, the Node B providing the first service through a primary carrier and providing the second service through a secondary carrier having a different frequency from the primary carrier, the apparatus comprising:

a first PICH (Paging Indication Channel) receiver for receiving paging indication information from the Node B through the primary cater by oscillating the primary carrier as a reception frequency;

a PCH (Paging Channel) receiver for receiving paging information from the Node B through the primary carrier or the secondary carrier by oscillating the primary carrier or the secondary carrier as the reception frequency under a predetermined control;

a second PICH (Paging Indication Channel) receiver for receiving paging indication information from the Node B through the secondary carrier by oscillating the secondary carrier as a reception frequency;

a PBMSCH (Physical Broadcast Multicast Shared Channel) receiver for receiving data of the second service through the secondary carrier by oscillating the secondary carrier as the reception frequency; and a controller for controlling the primary carrier or the secondary carrier to be oscillated as the reception frequency of the PCH receiver if the paging indication information indicates paging.

4. The apparatus of claim 3, wherein the paging indication information is transmitted only to UEs receiving the second service.

5. A method for providing a first service of paging a UE (User Equipment) while a second service is in progress at a Node B in a mobile communication system including the Node B and a plurality of UEs within a cell area of the Node B, the method comprising:

providing the first service through a primary carrier by the Node B;

transmitting paging indication information through the primary carrier;

transmitting paging information through the primary carrier;

providing the second service to at least one of the UEs through a secondary carrier having a different frequency from the primary carrier, and periodically transmitting paging indication information for the first service to the UE through the secondary carrier while transmitting the second service through the secondary carrier, wherein the UE reads the primary carrier based on the paging indication information transmitted through the secondary carrier.

6. The method of claim 5, wherein the first service has a higher priority than the second service.

7. A method for receiving paging for a first service from a Node B while a second service, different from the first service, is in progress at a UE (User Equipment) in a mobile communication system including the Node B and a plurality of UEs within a cell area of the Node B, the method comprising:

providing the first service through a primary carrier by the Node B;

providing the second service through a secondary carrier having a different frequency from the primary carrier;

periodically receiving paging indication information for the first service through the secondary carrier while receiving the second service through the secondary carrier by the UE;

receiving paging information if the paging indication information indicates paging; and receiving the first service through the primary carrier by switching a reception frequency of the UE to the primary carrier, wherein the UE reads the primary carrier based on the paging indication information received through the secondary carrier.

8. The method of claim 7, wherein the first service has a higher priority than the second service.

9. A method for receiving paging for a first service from a Node B while a second service, different from the first service, is in progress at a UE (User Equipment) in a mobile communication system including the Node B and a plurality of UEs within a cell area of the Node B, the method comprising:

providing the first service through a primary carrier by the Node B;

providing the second service through a secondary carrier having a different frequency from the primary carrier;

periodically receiving paging indication information for the first service through the secondary carrier while receiving the second service through the secondary carrier by the UE;

receiving paging information through the primary carrier by switching a reception frequency of the UE to the primary carrier if the paging indication information indicates paging; and receiving the first service through the primary carrier, wherein the UE reads the primary carrier based on the paging indication information received through the secondary carrier.

10. The method of claim 9, wherein the first service has a higher priority than the second service.

11. A method for paging a UE (User Equipment) for a first service while a second service, different from the first service, is in progress at a Node B in a mobile communication system including the Node B and a plurality of UEs within a cell area of the Node B, the method comprising:

providing the first service through a primary carrier by the Node B;

providing the second service through a secondary carrier having a different frequency from the primary carrier;

transmitting paging indication information for the first service to the UE through the secondary carrier when the UE is paged while transmitting the second service through the secondary carrier; and transmitting paging information to the UE through the secondary carrier corresponding to the paging indication information, wherein the UE reads the primary carrier based on the paging indication information transmitted through the secondary carrier 12. A method for paging a UE (User Equipment) for a first service while a second service, different from the first service, is in progress at a Node B in a mobile communication system including the Node B and a plurality of UEs within the cell area of the Node B, the method comprising:

providing the first service through a primary carrier by the Node B;

providing the second service through a secondary carrier having a different frequency from the primary carrier;

transmitting paging indication information for the first service to the UE through the secondary carrier when the UE is paged while transmitting the second service through the secondary carrier; and transmitting paging information to the UE through the primary carrier corresponding to the paging indication information, wherein the UE reads the primary carrier based on the paging indication information transmitted through the secondary carrier.

13. The method of claim 12, wherein the paging indication information is transmitted only to UEs that are receiving the second service.

14. The method of claim 12, wherein the first service has a higher priority than the second service.

15. A method for paging a UE (User Equipment) for a first service while a second service, different from the first service, is in progress at a Node B in a mobile communication system including the Node B and a plurality of UEs within a cell area of the Node B, the method comprising:

providing the first service through a primary carrier by the Node B;

providing the second service through a secondary carrier having a different frequency from the primary carrier; and periodically transmitting paging indication information for the first service to the UE through the secondary carrier when the UE is paged while transmitting the second service through the secondary carrier, wherein the UE reads the primary carrier based on the paging indication information transmitted through the secondary carrier 16. A method for receiving paging for a first service from a Node B while a second service, different from the first service, is in progress at a UE (User Equipment) in a mobile communication system including the Node B and a plurality of UEs within a cell area of the Node B, the method comprising:

providing the first service through a primary carrier by the Node B;

providing the second service through a secondary carrier having a different frequency from the primary carrier;

receiving paging indication information for the first service through the secondary carrier while receiving the second service through the secondary carrier by the UE; and receiving the first service through the primary carrier by switching a reception frequency of the UE to the primary carrier, wherein the UE reads the primary carrier based on the paging indication information received through the secondary carrier.

17. The method of claim 16, wherein the first service has a higher priority than the second service.

* * * * *

UNITED STATES PATENT AND TRADEMARK OFFICE
CERTIFICATE OF CORRECTION

PATENT NO. : 7,630,725 B2  Page 1 of 1
APPLICATION NO. : 10/274565
DATED : December 8, 2009
INVENTOR(S) : Kwak et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 633 days.

Signed and Sealed this

Twenty-first Day of December, 2010

David J. Kappos
*Director of the United States Patent and Trademark Office*